United States Patent

[11] 3,621,922

| [72] | Inventor | Jacob O. Hinken<br>321 N. Jackson, Litchfield, Ill. 62056 |
|---|---|---|
| [21] | Appl. No. | 35,614 |
| [22] | Filed | May 8, 1970 |
| [45] | Patented | Nov. 23, 1971 |

[54] ROLLING FENDER
1 Claim, 7 Drawing Figs.

[52] U.S. Cl. .................................................. 172/555,
172/604
[51] Int. Cl. ..................................................... A01b 21/02,
A01b 23/06
[50] Field of Search ........................................... 172/555,
556, 604, 518, 510

[56] References Cited
UNITED STATES PATENTS
| 369,163 | 8/1887 | Clark | 172/555 |
| 570,828 | 11/1896 | Tracy | 172/555 |
| 1,911,623 | 5/1933 | Karl | 172/555 |
| 2,575,321 | 11/1951 | Traver | 172/555 |
| 2,599,843 | 6/1952 | Knutzen | 172/555 |

Primary Examiner—Robert E. Pulfrey
Assistant Examiner—Stephen C. Pellegrino
Attorney—Gravely, Lieder & Woodruff ABSTRACT: A one-piece rolling fender having a curved central portion with teeth extending outwardly therefrom, each tooth having a concave forward edge and a strengthening rib, which is inclined rearwardly when said tooth contacts the ground, there being a connecting portion between the teeth. This fender shape prevents too much dirt from being thrown up on a plant row by a cultivator, and the fender itself throws the proper amount of dirt up onto a plant row to smoother weeds.

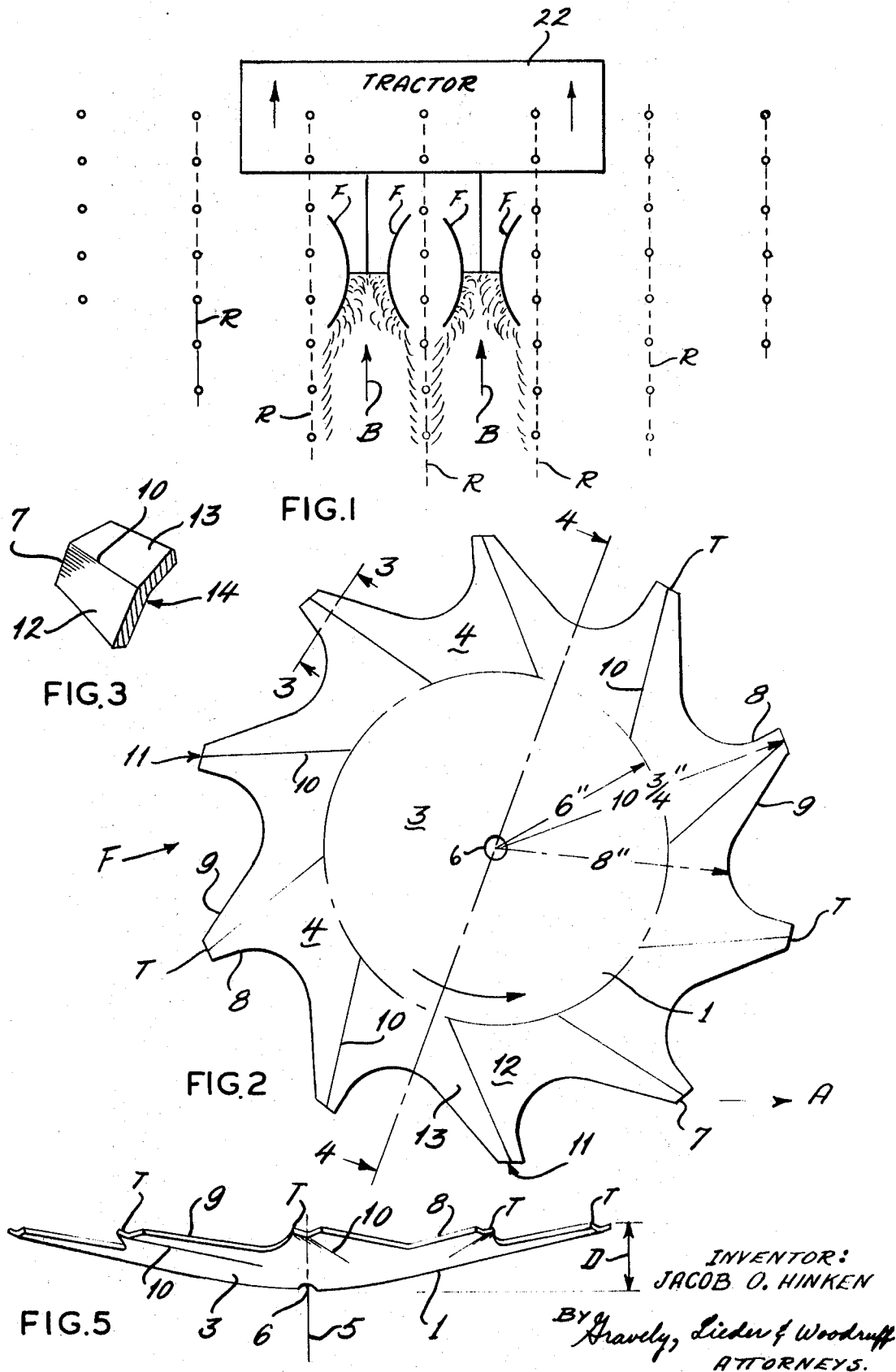

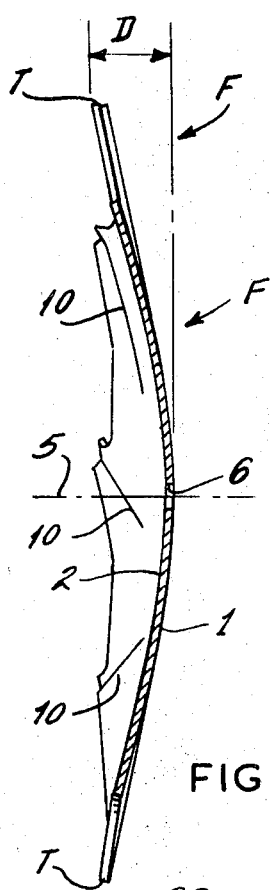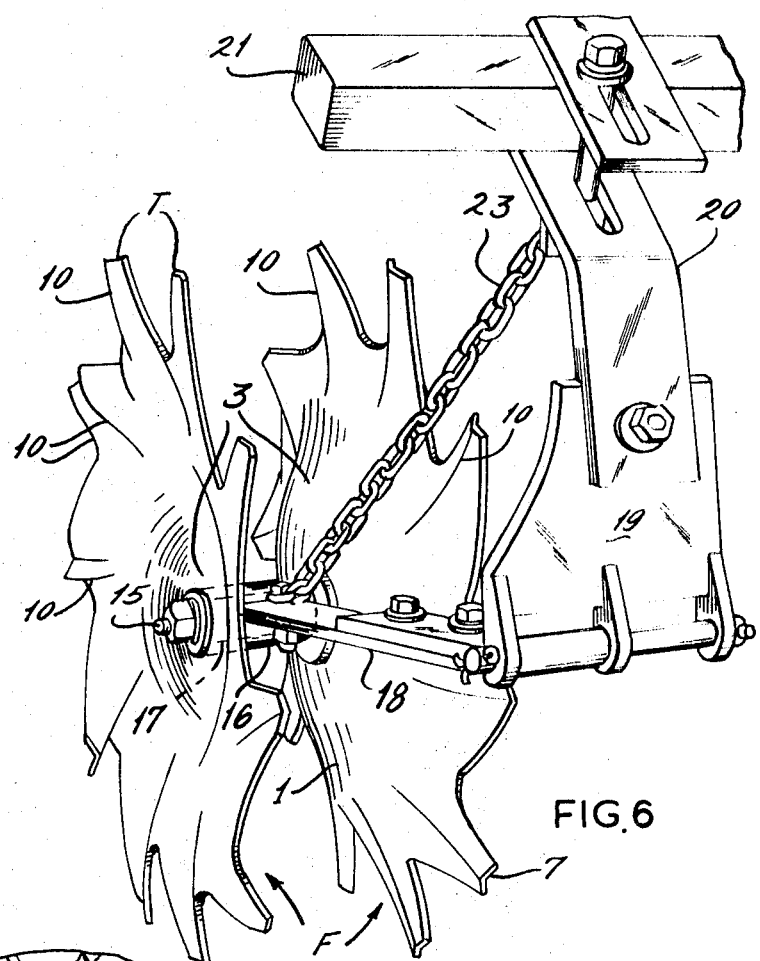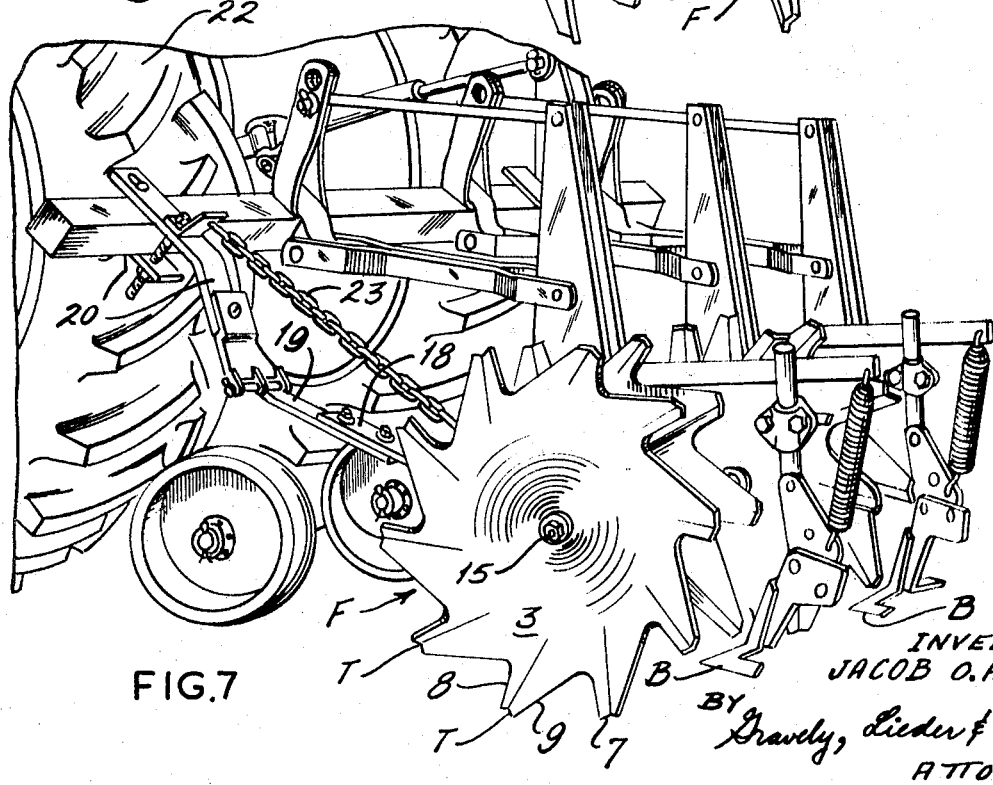

ROLLING FENDER

This invention relates to an improved rolling fender and in particular, to a rolling fender which is adapted to throw a predetermined amount of dirt on a plant row and not pick up trash or undesirable articles on its teeth.

In the past, there have been dished and planar chopping devices and cultivators which are positioned behind a tractor for chopping cotton, cutting weeds, or cultivating. There have also been devices which have been positioned forwardly of a cultivator and adapted to throw dirt on a plant row, as does the cultivator blade itself. However, these devices did not prevent too much dirt from being thrown up, often became clogged with trash or weeds, and did not prevent too much dirt from being thrown up on the plant row by the cultivator blade itself.

One of the principal objects of the present invention is to provide a rolling fender which has a curved central portion and teeth extending outwardly therefrom which are designed to throw up a predetermined amount of dirt onto a plant row and whose convex side is designed to prevent too much dirt from being pushed by the cultivator blade to the plant row. Another object is to provide a rolling fender which does not pick up trash on its teeth. Another object is to provide a rolling fender which is made from one piece of material.

These and other objects and advantages will become apparent hereinafter.

The invention is embodied in a one-piece rolling fender having a curved central portion with a plurality of teeth extending outwardly therefrom, each tooth having a relatively flat outer edge, a concave forward portion and a strengthening rib therein which extends rearwardly when said tooth contacts the ground.

The invention also consists in the parts and in the arrangements and combinations of parts hereinafter described and claimed. In the accompanying drawings which form part of this specification and wherein like numerals and letters refer to like parts wherever they occur:

FIG. 1 is a diagrammatic fragmentary top plan view of four rolling fenders embodying the present invention positioned forwardly of the cultivator blades drawn by a tractor, FIG. 2 is a side elevational view of the convex side of a rolling fender embodying the present invention, FIG. 3 is a cross-sectional view taken along the line 3—3 of FIG. 2 showing a cross section along the outer portion of a tooth, FIG. 4 is a cross-sectional view of the rolling fender taken along the line 4—4 of FIG. 2, FIG. 5 is a side elevational view of said rolling fender, FIG. 6 is a fragmentary perspective view showing a pair of rolling fenders mounted on a tool bar, and FIG. 7 is a fragmentary perspective view showing the position of the rolling fenders and their mounting brackets with respect to the cultivator blade.

Referring now to the drawings in detail, it will be seen that to of the invention which has been illustrated comprises a rolling fender F having a convex side or surface 1 and a concave side or surface 2. The fender F has a curved central portion 3 with a plurality of teeth T extending outwardly therefrom. The teeth T do not extend symmetrically in a radial direction, but the bottom tooth T which contacts the ground slants forwardly in the direction of movement of the tractor, as shown by the arrow A. Outwardly of the curved central portion 3 and between the teeth T are connecting portions 4. The rolling fender F has a center or axis 5 with an opening 6 therearound.

Each tooth T has a relatively flat outer edge 7 which is a small segment of a circle of large diameter, a concave forward edge portion 8 and a relatively straight rear edge portion 9 which connects with the concave forward edge portion 8 of the next adjacent tooth T. Each tooth T has a strengthening rib 10 which extends from the outer edge 7 inwardly to the curved central portion 3 at an angle to a line from the axis 5 to the point 11 where the rib 10 meets the outer edge 7. This angle is an acute angle of about 17°. Thus, when the point 11 contacts the ground, as shown in FIG. 2, the rib 10 on the bottom tooth T which contacts the ground extends rearwardly from a vertical line at an angle of about 17°. The rib 10, which is straight, divides each tooth T into a forward tooth portion 12 which has the concave forward edge 8 and a rear tooth portion 13 which has the relatively straight rear edge 9. The forward tooth portion 12 is angularly positioned with respect to the rear tooth portion 13 thereby forming a shallow pocket or trough 14 therebetween.

It has been found that a rolling fender F stamped from suitable material, such as 12-gauge cold-rolled steel, gives good results.

The outer edges 7 of the teeth T are on a 21.5 inches diameter circle and the curved central portion has a diameter of about 12 inches The curvature or distance D in FIG. 4 is preferably about 2 inches, so that the thickness of the fender F is about one-tenth the diameter thereof. The outside diameter of the connecting portions is about 16 inches. These dimensions are mentioned to illustrate the amount of curvature which gives the desired results. Of course, the condition of the soil and the speed of the tractor are also factors which determine the amount of soil or dirt which is thrown up on a plant row R. If the rolling fenders F are moved forwardly with respect to the cultivator blades B, the amount of dirt thrown up is decreased. Conversely, if the fenders F are moved rearwardly toward the cultivator blades B, the amount of dirt is increased. Thus, with the rolling fender F shown, adjustment is required depending upon the speed of travel and the condition of the ground.

The rolling fenders F which embody the present invention are shown in mounted or assembled position in FIGS. 6 and 7. A pair of fenders F is mounted on a shaft 15 with a sleeve 16 and suitable bearings 17 therebetween with their concave sides 2 facing one another. A slotted lower bracket 18 extends forwardly and receives a center hinged bracket 19 which in turn has a top bracket 20 connected thereto which is mounted on a universal tool bar 21. The universal tool bar 21 is mounted laterally across the rear of a tractor 22 and supports suitable brackets for the cultivator blades B as well as the brackets for the rolling fenders F. A chain 23 extends from the top bracket 20 to the lower bracket 18 to permit the rolling fenders F to be adjusted or lifted out of contact with the ground.

In operation, the cultivator blades B dig into the earth between the plant rows R to dig up weeds and deposit soil on a plant row R to smother small weeds. However, this uncontrolled action sometimes throws too much dirt on the plant row thereby smothering the plants themselves, or at other times, throws too little dirt on the plant rows R in which case the weeds grow along with the plants and take nourishment therefrom. The present rolling fenders F are designed and shaped so that the convex side 1 of the curved portion 3 and the connecting portions 4 prevent too much dirt from being thrown up on the plant row R, while the teeth T and their concave forward edge portions 8 and the cavity or trough 14 formed by the rib 10 throw up a predetermined amount of dirt onto the plant row R. This dirt has previously been pushed up by the action of the cultivator blade B. As previously described, moving the fenders forward decreases the amount of dirt and moving the fenders backwards toward the cultivator blades increases the amount of dirt thrown up on a plant row.

What is claimed is:

1. A one-piece rolling fender comprising a curved central portion, said curved central portion having a plurality of teeth extending outwardly therefrom, said teeth each having a concave forward edge portion and relatively straight rear edge portion, said teeth each having an inclined strengthening rib extending inwardly from the outer edge of each tooth to said curved central portion, said strengthening rib extending rearwardly about 17° from a vertical line drawn between the point of contact of the tooth with the ground and the center of the rolling fender, the outer edges of said teeth being positioned laterally from the center of the curved central portion a distance of approximately one-tenth of the diameter of the outer edges of the teeth of said rolling fender, whereby said teeth protect against the excessive dumping of dirt on a plant row and do not pick up trash or undesirable articles.

* * * * *